(12) United States Patent
Wang et al.

(10) Patent No.: US 11,956,152 B2
(45) Date of Patent: Apr. 9, 2024

(54) TRAFFIC FLUCTUATION PREDICTION DEVICE, METHOD AND PROGRAM

(71) Applicant: NIPPON TELEGRAPH AND TELEPHONE CORPORATION, Tokyo (JP)

(72) Inventors: Yitu Wang, Musashino (JP); Takayuki Nakachi, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/919,311

(22) PCT Filed: Apr. 24, 2020

(86) PCT No.: PCT/JP2020/017843
§ 371 (c)(1),
(2) Date: Oct. 17, 2022

(87) PCT Pub. No.: WO2021/215007
PCT Pub. Date: Oct. 28, 2021

(65) Prior Publication Data
US 2023/0208763 A1    Jun. 29, 2023

(51) Int. Cl.
*H04L 47/127*    (2022.01)
*H04L 43/04*    (2022.01)
*H04L 43/067*    (2022.01)

(52) U.S. Cl.
CPC ............ *H04L 47/127* (2013.01); *H04L 43/04* (2013.01); *H04L 43/067* (2013.01)

(58) Field of Classification Search
CPC ...... H04L 47/127; H04L 43/04; H04L 43/067
See application file for complete search history.

(56) References Cited

PUBLICATIONS

B. Zhou, D. He, Z. Sun, and W. H. Ng, "Network traffic modeling and prediction with ARIMA/GARCH", Proc. of HET-NETs, pp. 1-10, Jul. 2005.
(Continued)

*Primary Examiner* — Ryan J Jakovac
(74) *Attorney, Agent, or Firm* — Harness, Dickey & Pierce, P.L.C.

(57) ABSTRACT

The present disclosure has been made in view of such a problem, and an object of the present disclosure is to make it possible to predict fluctuation of unsteady traffic with a small amount of calculation.
A traffic fluctuation prediction apparatus (91) according to the present disclosure includes: a data division unit (12) that divides time-series data $X_N(t)$ in a certain period of the traffic into estimation and prediction data sets; a learning unit (13) that learns a dictionary $D_r(t)$ using one of the two divided data sets, and learns a dictionary $D_p(t)$ using the other of the two divided data sets; a prediction unit (14) that obtains a sparse code $Y_N(t)$ in representing the time-series data using the learned dictionary $D_r(t)$ and obtains a predicted value $X_N\hat{}(t)$ of future traffic using the obtained sparse code $Y_N(t)$ and the dictionary $D_p(t)$; and a prediction correction unit (15) that corrects a prediction error of the predicted value $X_N\hat{}(t)$ obtained by the prediction unit (14) using search for a stable region of a double queue of overestimation and underestimation.

3 Claims, 5 Drawing Sheets

[3]

(56) References Cited

PUBLICATIONS

Y. Hua, Z. Zhao, R. Li, X. Chen, Z. Liu, and H. Zhang, "Deep learning with long short-term memory for time series prediction", IEEE Commun. Mag., vol. 57, No. 6, pp. 114-119, Jun. 2019.

M. J. Neely, "Stochastic network optimization with application to communication and queueing systems", Synthesis Lec. Commun. Netw., vol. 3, No. 1, pp. 1-211, May 2010.

TRAFFIC FLUCTUATION PREDICTION DEVICE, METHOD AND PROGRAM

CROSS-REFERENCE TO RELATED APPLICATIONS

This application is a 371 U.S. National Phase of International Application No. PCT/JP2020/017843, filed on Apr. 24, 2020. The entire disclosure of the above application is incorporated herein by reference.

TECHNICAL FIELD

The present disclosure relates to a technology for predicting unsteady traffic fluctuation with high accuracy.

BACKGROUND ART

With the increase in high-definition video traffic such as 4K/8K and the circulation of various types of information in an Internet of Things (IoT) era, the quality and amount of communication traffic are diversifying. In such a background, there is a demand for a technology for predicting unsteady traffic fluctuation with high accuracy. A proactive control technology based on prediction in path control or the like makes it possible to provide high-quality network services.

As a scheme of time-series analysis in the related art, many schemes based on the theory of stochastic processes have been studied. Examples of a typical scheme include an auto-regressive integrated moving average (ARIMA) model (see, for example, NPL 1). ARIMA is a model obtained by combining auto-regressive (AR) and moving average (MA) with differential series, and has the flexibility to apply to various forms of time-series data. However, ARIMA model selection requires the experience or discretion of an analyst to determine many parameters (auto-regressive, differential, and moving average), and it is not always easy to improve prediction accuracy.

On the other hand, with the rapid development of machine learning represented by deep learning in recent years, a data-driven prediction method has been proposed. In the literature [See, for example, NPL 2], a randomly connected long short-term memory (RCLSTM) based on deep learning is proposed. In the RCLSTM, neurons of a memory block are randomly and sparsely connected, and a calculation time is reduced with only a slight decrease in performance. However, in order to follow unsteady network traffic that dynamically fluctuates and maintain high predictive performance, it is necessary to change parameters frequently while performing learning. A deep learning-based scheme requires a number of computational resources such as customized hardware and software acceleration.

CITATION LIST

Non Patent Literature

NPL 1: B. Zhou, D. He, Z. Sun, and W. H. Ng, "Network traffic modeling and prediction with ARIMA/GARCH," Proc. of HET-NETs, pp. 1-10, July 2005.

NPL 2: Y. Hua, Z. Zhao, R. Li, X. Chen, Z. Liu, and H. Zhang, "Deep learning with long short-term memory for time series prediction," IEEE Commun. Mag., Vol. 57, no. 6, pp. 114-119, June 2019.

NPL 3: M. J. Neely, "Stochastic network optimization with application to communication and queueing systems," Synthesis Lec. Commun. Netw., Vol. 3, no. 1, pp. 1-211, May 2010.

SUMMARY OF THE INVENTION

Technical Problem

The present disclosure has been made in view of such a problem, and an object of the present disclosure is to make it possible to predict fluctuation of unsteady traffic with a small amount of calculation.

Means for Solving the Problem

A traffic fluctuation prediction apparatus according to the present disclosure includes a data division unit that divides time-series data of traffic into two data sets; a learning unit that learns a dictionary $D_r(t)$ using one of the two divided data sets and learns a dictionary $D_p(t)$ using the other of the two divided data sets; a prediction unit that obtains a sparse code $Y_N(t)$ in representing the time-series data using the dictionary $D_r(t)$ learned in the learning unit, and obtains a predicted value $X_N\hat{\ }(t)$ of future traffic using the obtained sparse code $Y_N(t)$ and the dictionary $D_p(t)$ learned in the learning unit; and a prediction correction unit that corrects a prediction error of the predicted value $X_N\hat{\ }(t)$ obtained by the prediction unit using a search for a stable region of a double queue of overestimation and underestimation.

A traffic fluctuation prediction method according to the present disclosure includes: dividing, by a data division unit, time-series data of traffic into two data sets; learning, by a learning unit, a dictionary $D_r(t)$ using one of the two divided data sets, and learning, by the learning unit, a dictionary $D_p(t)$ using the other of the two divided data sets; obtaining, by a prediction unit, a sparse code $Y_N(t)$ in representing the time-series data using the dictionary $D_r(t)$ learned in the learning unit, and obtaining, by the prediction unit, a predicted value $X_{NA}(t)$ of future traffic using the obtained sparse code $Y_N(t)$ and the dictionary $D_p(t)$ learned in the learning unit; and correcting, by a prediction correction unit, a prediction error of the predicted value $X_N\hat{\ }(t)$ using a search for a stable region of a double queue of overestimation and underestimation.

A traffic fluctuation prediction program of the present disclosure is a program for causing a computer to execute: dividing, by a data division unit, time-series data of traffic into two data sets; learning, by a learning unit, a dictionary $D_r(t)$ using one of the two divided data sets, and learning, by the learning unit, a dictionary $D_p(t)$ using the other of the two divided data sets; obtaining, by a prediction unit, a sparse code $Y_N(t)$ in representing the time-series data using the dictionary $D_r(t)$ learned in the learning unit, and obtaining, by the prediction unit, a predicted value $X_N\hat{\ }(t)$ of future traffic using the obtained sparse code $Y_N(t)$ and the dictionary $D_p(t)$ learned in the learning unit; and correcting, by a prediction correction unit, a prediction error of the predicted value $X_N\hat{\ }(t)$ using a search for a stable region of a double queue of overestimation and underestimation.

Effects of the Invention

According to the present disclosure, it is possible to perform highly accurate prediction even for fluctuation of unsteady traffic with a smaller amount of calculation than in the related art.

BRIEF DESCRIPTION OF DRAWINGS

FIG. 5(a) illustrates a comparison with a true value,
and FIG. 5(b) illustrates an RMSE with respect to a dictionary size.

DESCRIPTION OF EMBODIMENTS

Hereinafter, embodiments of the present disclosure will be described in detail with reference to the drawings. The present disclosure is not limited to the embodiments described below. These implementations are merely examples, and the present disclosure can be implemented in various modifications and improvements based on knowledge of those skilled in the art. It is assumed that components having the same reference signs in the present specification and the drawings indicate the same components.

While ARIMA and RCLSTM have the above problem, these suggest that accurate prediction can be executed by utilizing sparsity of traffic of a network. Accurate traffic prediction can be performed with a much smaller number of measured values than previously expected. In order to more effectively utilize such sparsity, a sparse representation stands out as an efficient modeling function, and has been shown to be a powerful tool especially for a wide range of fields of application such as signal processing and machine learning.

In sparse representation, an observed signal is represented by a linear weighted sum of a small number of bases. The number of bases is larger than the number of observed signals, which is overcomplete, and by appropriately selecting a small number of bases makes it possible to adaptively keep a balance between long-term dependence and short-term dependence and to avoid over-learning. However, for the following reasons, direct application of sparse representation to traffic estimation does not improve prediction accuracy.

1. Constraint of causality
The sparse representation in the related art strictly has a constraint of causality, and there is a limit to the improvement of prediction accuracy.
2. Following unsteady traffic
The sparse representation in the related art is optimized based on an average value of a prediction error. Thus, for traffic that suddenly fluctuates, a predicted value deviates from an optimum value.

In order to solve these problems, the sparse representation is extended as follows in the present disclosure.
1. Simultaneous learning of estimation and prediction dictionaries
A sparse representation and a sparse code of a prediction model are optimized at the same time to estimate a prediction point with high accuracy. In this method, the sparse code is optimized to include an estimated traffic value from a present point to a future prediction point, and the prediction accuracy is improved.
2. Following sudden fluctuation through Lyapunov optimization
Lyapunov optimization is used to correct the predicted value and minimize a temporal average prediction error. Specifically, a double queue stem including both overevaluation and underevaluation queues is used to follow the traffic that suddenly fluctuates.

Hereinafter, a system model and problem setup will be performed before describing a specific example of the embodiment.

System Model
A multi-hop network defined by a directed graph:
[Math. 31]

$$\mathcal{G} = (\varepsilon, \mathcal{L})$$

is considered. Here,
[Math. 32]

$$\varepsilon$$

and
[Math. 33]

$$\mathcal{L}$$

indicate sets of E nodes and L links, respectively. It is assumed that there are N time slots per day. A flow between a transmission source and a connection destination is generated for each application.

The flow is set as j and a set of J flows is defined as
[Math. 34]

$$\mathcal{J}$$

For each flow j, a set of P paths
[Math. 35]

$$\mathcal{P}$$

is described and a topology matrix is defined as shown in the following equation
[Math. 36]

$$A_j(t) = (a_{j,l,p}(t))_{L \times P}.$$

[Math. 1]

[Math. 1]

$$a_{j,l,p}(t) = \begin{cases} 1, & \text{When Path } p \text{ includes link } l \\ 0, & \text{Others} \end{cases} \quad (1)$$

A topology matrix $A_j(t)$ gives a path-to-link mapping relationship. A traffic $x_l(t)$ on a link in the past time is described as shown in the following equation
[Math. 37]

$$l \in \mathcal{J}$$

[Math. 2]

[Math. 2]

$$x_l(t) = \sum_{j \in \mathcal{J}} A_j(t) w_j(t) \quad (2)$$
$$= \sum_{j \in \mathcal{J}} \sum_{p \in \mathcal{P}_j} a_{j,l,p}(t) w_{j,p}(t)$$

Here, $w_{j,p}(t)$ indicates an amount of traffic of the flow j on the path p. Equation (2) is established on a time scale longer than a round trip time (RTT). Here, it is assumed that a cache capacity is limited and only data of past K days can be used for $A_j(t)$ and $w_j(t)$.

Problem Setting

Traffic of interest is predicted based on information on past finite traffic. Here, a time-series signal of the traffic is defined as

[Math. 38]

$$\{X_N(t-K), X_N(t-K+1), \ldots, X_N(t)\}.$$

Here,

[Math. 39]

$$X_N(t)=[x(tN), x(tN+1), x(tN+2), \ldots, x(tN+N-1)]^T$$

indicates N time slot vectors at time t [day]. Further, index 1 of a link is omitted to simplify a notation.

The problem is to perform prediction of traffic in a first time slot and minimize a temporal average of the prediction error.

[Math. 3]

[Math. 3]

$$\min_{\tilde{X}_N(t)} \mathbb{E}_t\left[\left\|\left\|\tilde{X}_N(t)-X_N(t)\right\|\right\|_1\right] \quad (3)$$

$$\text{s.t. } \tilde{X}_N(t) = f(X_N(t-1), \ldots, X_N(t-K))$$

Here, f(·) indicates a prediction function.

Example of First Embodiment: Traffic Prediction Based on Sparse Representation
(1) Sparse Representation A sparse representation is a linear system that is represented by a weighted linear sum of a small number of basis vectors. When K observed values of traffic

[Math. 40]

$$X(t)=\{X_N(t-K), \ldots, X_N(t-1)\}$$

are obtained, the dictionary

[Math. 41]

$$D(t) \in \mathbb{R}^{N \times T}$$

can be obtained by solving the following equation.

[Math. 4]

$$\min \|X(t)-D(t)Y(t)\|2/2, \text{ s.t.} \|Y(t)\|_0 \leq \gamma D_{(t)} \quad (4)$$

Here,

[Math. 42]

$$Y(t) \in \mathbb{R}^{T \times K}$$

is the sparse code, and

[Math. 43]

$$\|\cdot\|_0$$

is a $l_0$ norm (the number of non-zero elements), and $\gamma$ is a parameter of a sparse constraint.

The dictionary D(t) can compactly express the observed value X(t) of the traffic, and simultaneously use self-similarity of the traffic to efficiently express the observed value X(t) not included in a training data set. That is, an observed value X(τ) at time t not included in the training data set can be expressed using the dictionary D(t) and a sparse code $Y_N(\tau)$ as shown in the following equation.

[Math. 5]

[Math. 5]

$$\min_{Y_N(\tau)} \|X_N(\tau) - D(t)Y_N(\tau)\|_2^2, \text{ s.t. } \|Y_N(\tau)\|_0 \leq \gamma \quad (5)$$

Further, the sparse representation has the following advantages.

1. Data-driven learning with a small amount of calculation

Efficient modeling using self-similarity makes it possible to construct a data-driven learning algorithm with a small amount of calculation.

2. Dynamic traffic learning in which prior knowledge is not necessary.

Characteristics is dynamically learned by extracting a basic pattern without requiring prior knowledge of traffic characteristics (2) Sparse Representation with Prediction Function The sparse representation in the related art is extended for a good balance between efficient modeling and dynamic learning. Three steps are included.

1. Division into two data sets

The observed value X(t) of the traffic is divided into two data sets including estimation and prediction.

2. Simultaneous learning of estimation and prediction dictionaries

In order to map traffic data at a current time with traffic data at a time T+1 ahead, the estimation and prediction dictionaries are learned at the same time.

3. Prediction of Traffic at Time T+1

The sparse code is estimated based on the estimated dictionary and mapping is performed between past traffic data and future traffic data.

Figure 1:
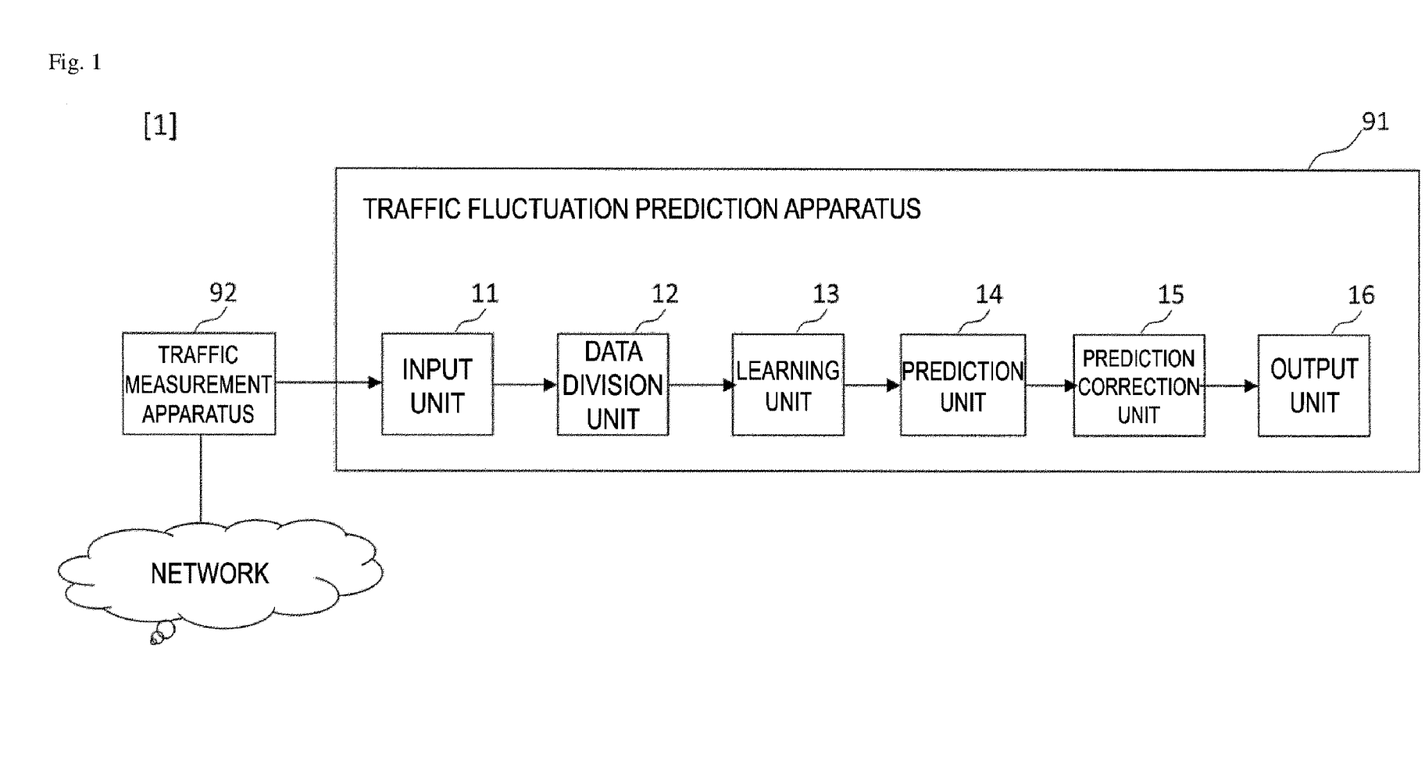
FIG. 1 illustrates an example of a system configuration of the present disclosure.

FIG. 1 illustrates an example of a system configuration according to the present disclosure. In a system according to the present disclosure, a traffic fluctuation prediction apparatus 91 and a traffic measurement apparatus 92 are communicatively connected. The traffic fluctuation prediction apparatus 91 includes an input unit 11, a data division unit 12, a learning unit 13, a prediction unit 14, and an output unit 16. The traffic fluctuation prediction apparatus 91 may include a prediction correction unit 15. The traffic fluctuation prediction apparatus 91 can also be realized by a computer and a program, and the program can be recorded on a recording medium or provided through a network.

The traffic measurement apparatus 92 is connected to the network and measures traffic transmitted on the network. Traffic to be measured is, for example, control data of a border gateway protocol (BGP), a session initiation protocol (SIP), or a domain name system (DNS), real-time data of a real-time transport protocol (RTP) or an internet protocol television (IPTV), or non-real-time data of a hypertext transfer protocol (HTTP), a simple mail transfer protocol (SMTP), or peer-to-peer (P2P).

The input unit 11 continuously acquires the time-series data $X_N(t)$ in a certain period of time of the traffic transmitted via the network.

The data division unit 12 divides the time-series data $X_N(t)$ in a certain period of the traffic into estimation and prediction data sets.

The learning unit 13 simultaneously learns an estimation dictionary $D_r(t)$ and a prediction dictionary $D_p(t)$ of a sparse representation from the estimation and prediction data sets. The prediction unit 14 uses the dictionary $D_p(t)$ to obtain the sparse code $Y_N(t)$, and uses the sparse code $Y_N(t)$ and the dictionary $D_p(t)$ to obtain a predicted value $X_N\hat{}(t)$ of future traffic.

The output unit 16 outputs a prediction result of the prediction unit 14.

The prediction correction unit 15 corrects a prediction error of the predicted value $X_N\hat{}(t)$ using a search for a stable region of a double queue of overestimation and underestimation. The output unit 16 outputs a correction result of the prediction correction unit 15. A functions and operation of the prediction correction unit 15 will be described in a second embodiment.

Figure 2:
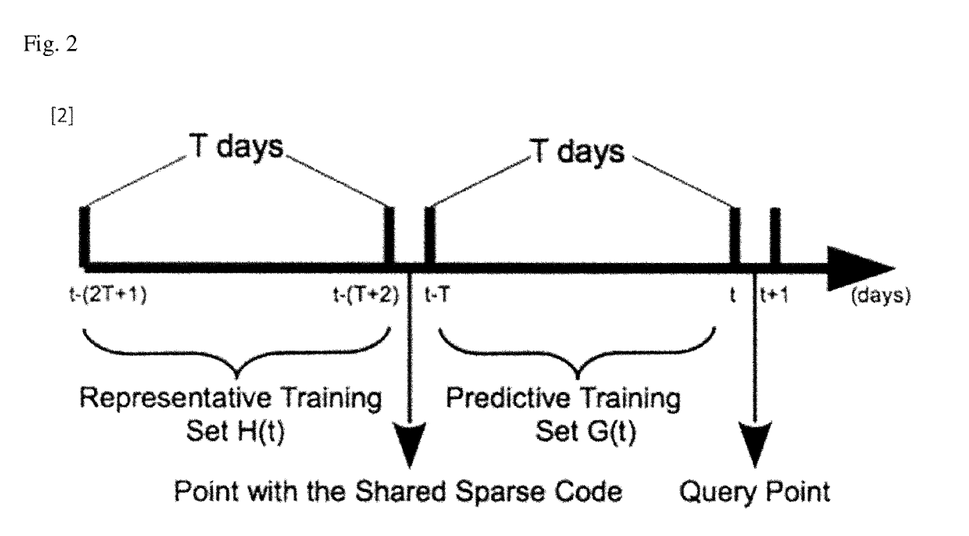
FIG. 2 illustrates an example of division of a learning set.

Hereinafter, three steps will be described. First, past observed values from $X_N(t-1)$ to $X_N(t-K)$ are divided into two data sets, as illustrated in FIG. 2. Specifically, a learning set H(t) and a learning set G(t) for prediction of the sparse representation are defined by the following equation.

[Math. 6]

[Math. 6]

$$\begin{cases} H(t) = [X_N(t-2T-1); \ldots ; X_N(t-T-2)] \\ G(t) = [X_N(t-T); \ldots ; X_N(t-1)] \end{cases} \quad (6)$$

Here, lengths of the data sets are the same and T=(K−1)/2.

Then, the dictionary $D_r(t)$ and the prediction dictionary $D_p(t)$ of the sparse representation are learned at the same time based on H(t) and G(t). Thus, a sparse code of $X_N(t-2T-2+i)$ regarding the dictionary $D_r(t)$ and a sparse code of $X_N(t-T-1+i)$ regarding the dictionary $D_p(t)$ are shared, and an optimization problem shown in Equation (7) is solved for realization.

[Math. 7]

[Math. 7]

$$\min_{D_r\omega, D_p\omega} \sum_{i=1}^{T} \|X_N(t-2T-2+i) - D_r(t)Y_N^r(t-2T-2+i)\|_2^2 + \quad (7)$$

$$\sum_{i=1}^{T} \|X_N(t-T-1+i) - D_p(t)Y_N^p(t-T-1+i)\|_2^2 \text{ s.t.} \|Y_N^r(t)\|_0 \le \gamma,$$

$$\|Y_N^p(t)\|_0 \le \gamma, Y_N^r(t-2T-2+i) = Y_N^p(t-T-1+i), \forall 1 \le i \le T$$

Equation (7) indicates a problem of minimization of a square norm error regarding H(t) and G(t) in a connected feature space (sparse code). Here,

[Math. 44]

$$Y_N^r(t) = [y^r(tN), y^r(tN+1), \ldots, y^r(tN+N-1)]^T$$

is a sparse code when $D_r(t)$ is used to express $X_N(t)$, and

[Math. 45]

$$Y_N^p(t) = [y^p(tN), y^p(tN+1), \ldots, y^p(tN+N-1)]^T$$

is a sparse code when $D_p(t)$ is used to express $X_N(t)$.

Equation (7) can be rewritten as illustrated in the following equation.

[Math. 8-1]

[Math. 8-1]

$$\min_{D_r(t), D_p(t)} \left\| \begin{bmatrix} H(t) \\ G(t) \end{bmatrix} - \begin{bmatrix} D_r(t) \\ D_p(t) \end{bmatrix} Y_{N,t}(t) \right\|_2^2 + \lambda \|Y_{N,T}(t)\|_0, \quad (8)$$

Here,

[Math. 46]

$$Y_{N,T}(t) = [Y_N^r(t-2T-1); \quad \ldots \quad ; Y_N^r(t-T-2)] = \\ [Y_N^p(t-T); \ldots ; Y_N^p(t-T-1)]$$

is a shared sparse code of T rows and N columns, and λ is a Lagrange multiplier of the sparse constraint. Equation (8) indicates a general sparse representation problem and can be efficiently solved using K-singular value decomposition (K-SVD).

It is possible to perform learning of the dictionary $D_r(t)$ by obtaining a sparse coefficient regarding a data set $X_N(t-2T-2+i)$, and to perform learning of the dictionary $D_p(t)$ by obtaining a sparse coefficient regarding a data set $X_N(t-T-1+i)$. In the present disclosure, a constraint is applied so that the sparse coefficients of the data set $X_N(t-2T-2+i)$ and the data set $X_N(t-T-1+i)$ become the same value. Thus, the sparse coefficient common to both an old data set $X_N(t-2T-2+i)$ and a new data set $X_N(t-T-1+i)$ is obtained by learning. Through this sparse coefficient, a past data set and a next data set are associated with each other. Actually, in predicting a future data set, a current latest data set and a future data set are associated with each other through the learned sparse coefficient, and the prediction can be performed.

Finally, the sparse code $Y_N(t)$ is calculated to predict $X_N(t)$. The sparse code $Y_N(t)$ can be obtained by solving the following equation using an observed value $X_N(t-T-1)$ of observed traffic and the dictionary $D_r(t)$ of the sparse representation.

[Math. 8-2]

[Math. 8-2]

$$\min_{Y_N(t)} \|X_N(t-T-1) - D_r(t)Y_N(t)\|_2^2 \text{ s.t.} \|Y_N(t)\|_0 \le \gamma, \quad (8)$$

This is a typical sparse problem, which can be solved efficiently by using an iterative projection method or the like. Using $Y_N(t)$ and $D_p(t)$, a predicted value of $X_N(t)$ can be obtained by the following equation.

[Math. 9]

$$\hat{X}_N(t) = D_p(t)Y_N(t). \quad (9)$$

In the present disclosure, the predicted value of $X_N(t)$ may be indicated as $X_N\hat{}(t)$.

The dictionary $D_r(t)$ and the dictionary $D_p(t)$ are constantly updated to obtain accurate prediction for characteristics of unsteadily fluctuating traffic. When new traffic data is received, observed values $X_N(t-2T-1)$ and $X_N(t-1)$ of past traffic are discarded, and observed values $X_N(t-T-1)$ and $X_N(t)$ of latest traffic, corresponding to the observed values $X_N(t-2T-1)$ and $X_N(t-1)$ respectively, are incorporated, and the learning set H(t+1) and the learning set G(t+1) for prediction of the sparse representation are updated. Then, a dictionary $D_p(t+1)$ and a dictionary $D_r(t+1)$ are updated accordingly.

According to simulation results, a training time of the dictionary is much shorter than a length of the time slot. Thus, such dynamic updating operates in real time and does not affect prediction. As described above, in the present embodiment, it is possible to perform highly accurate prediction even for fluctuation of unsteady traffic with a smaller amount of calculation than in the related art.

Example of Second Embodiment: Following Sudden Fluctuation Through Lyapunov Optimization In the sparse representation, optimization based on the average value of the prediction error is performed. Thus, when the traffic fluctuates suddenly, a deviation of the predicted value $X_N\hat{}(t)$ from an optimum value may occurs. In this section, a scheme for correcting the predicted value $X_N\hat{}(t)$ in the above situation is proposed.

When a predicted value x̂(t) of the traffic is overestimated (an estimated value larger than an actual value x(t)), the predicted value x̂(t) is corrected as in the following equation.

[Math. 10]

$$\tilde{x}(t) = \hat{x}(t) - v(t) \quad (10)$$

In the present disclosure, the predicted value of x(t) may be indicated as x^(t).

Similarly, when the predicted value x^(t) of x(t) is underestimated (an estimated value smaller than the actual value x(t)), the predicted value x^(t) is corrected as in the following equation.

[Math. 11]

$$\tilde{x}(t) = \hat{x}(t) + u(t) \quad (11)$$

Using this method, it is possible to give a more accurate estimated value. However, it is not easy to determine v(t) and u(t) because x(t) cannot be explicitly ascertained. When an inappropriate value is set, the prediction error becomes larger.

In order to deal with this problem, in the present disclosure, the Lyapunov optimization is adopted, and a problem of minimization of drift of Lyapunov in each time slot is considered. The determination is based solely on a length of a current queue. This method has an advantage that prior knowledge of an observed signal is not necessary and an amount of calculation is small. The Lyapunov optimization is adopted on a time slot basis so that it is possible to correct an estimation error of prediction based on the sparse representation and obtain a more accurate prediction result.

(1) Double Queuing System

Figure 3:
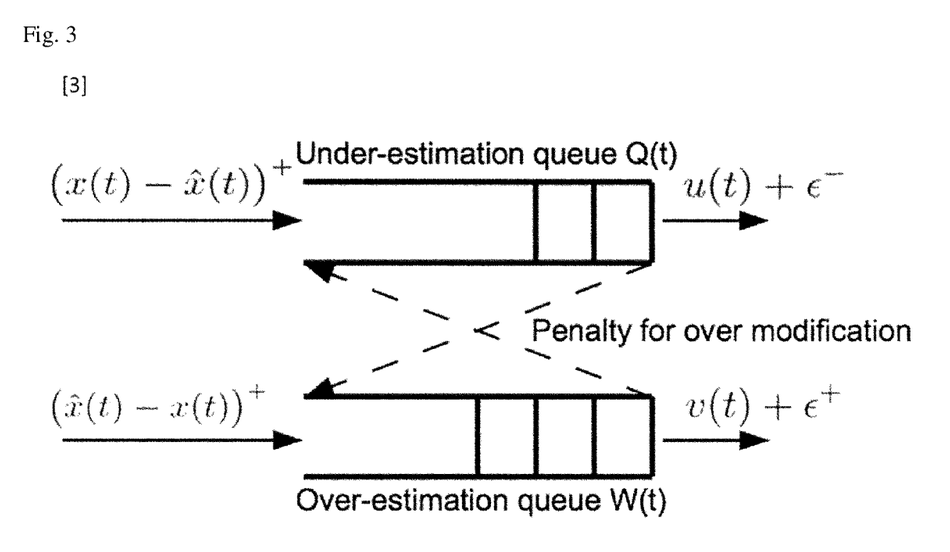
FIG. 3 illustrates a configuration example of a traffic fluctuation prediction apparatus.

Because the prediction error consists of two patterns including overestimation and underestimation, a double queuing system that holds respective amounts of overestimation and underestimation as illustrated in FIG. 3 is considered.

1) Queue of Overestimation:

An overestimation queue W(t) holds a past amount of overestimation as shown below.

a) Amount of overestimation of prediction based on sparse representation:

[Math. 47]

$$(\hat{x}(t) - x(t))^+$$

b) Amount of Overestimation due to correction:
Given that
[Math. 48]

$$\hat{x}(t) < x(t)$$

and u(t) is larger than
[Math. 49]

$$(x(t) - \hat{x}(t))$$

[Math. 50]

$$(\hat{x}(t) + u(t) - x(t))^+$$

The overestimation queue W(t) outputs the following two values.

a) Amount of correction: v(t)
b) Constraint value of a temporal average of prediction error: ε+

The overestimation queue W(t) is updated as follows.
[Math. 12]

[Math. 12]

$$W(t+1) = \underbrace{(W(t) - v(t) - \epsilon^+)^+}_{Queue\ departure} + \underbrace{(\hat{x}(t) - x(t))^+}_{Over-estimation} + \underbrace{(\hat{x}(t) + u(t) - x(t))^+ 1_{\{\hat{x}(t) < x(t)\}}}_{Over-modification}. \quad (12)$$

2) Underestimation Queue

An underestimation queue Q(t) holds an amount of past underestimation as shown below.

a) Amount of underestimation of prediction based on sparse representation:
[Math. 51]

$$(x(t) - \hat{x}(t))^+$$

b) Amount of underestimation due to correction:
Given that
[Math. 52]

$$\hat{x}(t) > x(t)$$

and v(t) is larger than
[Math. 53]

$$(\hat{x}(t) - x(t)),$$

[Math. 54]

$$(x(t) - \hat{x}(t) + v(t))^+$$

The underestimation queue W(t) outputs the following two values.

a) Amount of correction: u(t)
b) Constraint value of a temporal average of prediction error: ε−

The underestimation queue W(t) is updated as follows.
[Math. 13]

[Math. 13]

$$Q(t+1) = \underbrace{(Q(t) - u(t) - \epsilon^-)^+}_{Queue\ departure} + \underbrace{(x(t) - \hat{x}(t))^+}_{Under-estimation} + \underbrace{(x(t) - \hat{x}(t) + v(t))^+ 1_{\{\hat{x}(t) > x(t)\}}}_{Over-modification}. \quad (13)$$

In order to eliminate the dependency of u(t), v(t), and x(t), the problem is examined from the viewpoint of the stability of the queue. Based on NPL 3, the stability of the queue is defined by the following equation.

Definition 1 (Stability of Queue)
A queue R(t) is strongly stable when the following equation is satisfied.
[Math. 15]

[Math. 15]

$$\lim_{T \to \infty} \frac{1}{T} \left( \sum_{t=0}^{T} \mathbb{E}[R(t)] \right) < \infty. \quad (15)$$

When all the queues are strongly stable, the system is called stable.

Further, a capacity range is defined as follows.

Definition 2 (Capacity Range)
The capacity range A is defined as a closure consisting of all ε+ and ε− in which v(t) and u(t) become stable.

(2) Design and Performance Analysis of Algorithm

Under given $\epsilon^+$ and $\epsilon^-$, a quadratic Lyapunov function is used to stabilize the double queuing system. The quadratic Lyapunov function is defined by the following equation and can increase in the order of a square as a length of the queue increases, and impose a sufficient penalty for system stability.

[Math. 16]

$$L(Q(t), W(t)) = \frac{1}{2}\left(Q^2(t) + W^2(t)\right) \quad (16)$$

Then, in order to stabilize all queues, a Lyapunov drift
[Math. 17]

$$\Delta L(Q(t),W(t)) = \mathbb{E}\left[L(Q(t+1),W(t+1)) - L(Q(t),W(t))\right] \quad (17)$$

is minimized.

A drift regarding the overestimation queue W(t) in Equation (17) can be expressed as Equation (18) using Equation (12).

[Math. 18]

$$\mathbb{E}\left[W^2(t+1) - W^2(t)\right] \leq \mathbb{E}\left[\frac{\left((\hat{x}(t) - x(t))^+ + (\hat{x}(t) + u(t) - x(t))^+ 1_{\{\hat{x}(t) < x(t)\}}\right)^2 + (\epsilon^+ + v(t))^2}{2} + \right.$$
$$\left. W(t)((\hat{x}(t) - x(t))^+ + (\hat{x}(t) + u(t) - x(t))^+ 1_{\{\hat{x}(t) < x(t)\}} - (\epsilon^+ + v(t)))\right] \leq$$
$$\mathbb{E}\left[B_w + W(t)(\hat{x}(t) - x(t))^+ + \frac{u^2(t)}{2} + W(t)(u(t) - v(t))\right] \quad (18)$$

Similarly, a drift regarding the underestimated queue Q(t) can be written and expressed. From the above, the Lyapunov optimization problem can be formulated as follows.

[Math. 19]

$$\min_{u(t),v(t)} \frac{u^2(t) + v^2(t)}{2} + (Q(t) - W(t))v(t) + (W(t) - Q(t))u(t) \quad (19)$$
$$\text{s.t. } u(t)v(t) = 0, \ u(t) \geq 0, \ v(t) \geq 0$$

When u(t)=0, Equation (19) can be formulated in a quadratic format regarding v(t) and can be solved using a convex optimization scheme. Equation (19) can be solved in the same way when v(t)=0. From the above, a solution of Equation (19) can be obtained as shown in the following equation.

[Math. 20]

$$\begin{cases} u(t) = Q(t) - W(t) \\ v(t) = 0 \end{cases} \text{if } Q(t) > W(t), \quad (20)$$

[Math. 21]

$$\begin{cases} u(t) = 0 \\ v(t) = W(t) - Q(t) \end{cases} \text{if } Q(t) \leq W(t) \quad (21)$$

The prediction based on the sparse representation can be rewritten as shown in the following equation from Equation (10)-Equation (11) and Equations (20)-Equation (21).

[Math. 22]

$$\tilde{x}(t) = \hat{x}(t) + Q(t) - W(t) \quad (22)$$

According to the following theorem, a proposed algorithm guarantees the stability of the queue and proves that the double queuing system is stable.

Theorem 1 (stability of the proposed algorithm)

A solution given by Equation (20)-Equation (21) enables a stable operation of W(t) and Q(t). Specifically, an average length of the queue satisfies the following equation.

[Math. 23]

$$\frac{1}{T}\sum_{i=1}^{T}\mathbb{E}[W(t) + Q(t)] \leq \frac{\mathbb{E}[B'_W + B'_Q]}{\beta} \quad (23)$$

Here, $\beta$ is a minimum value of a distance between given $\epsilon^+/\epsilon^-$ and a boundary value of the capacity range $\Lambda$, and $\mathbb{E}[B'_W]$ and $\mathbb{E}[B'_Q]$ indicate a boundary value given by the following equation.

[Math. 24]

$$\mathbb{E}[B'_W] = \mathbb{E}[B_W] + \frac{\gamma^2}{2} \quad (24)$$

[Math. 25]

$$\mathbb{E}[B'_Q] = \frac{(\alpha^-)^2 + 2\gamma\alpha^- + (\epsilon^- + \gamma)^2 + \gamma^2}{2} \quad (25)$$

Here,
[Math. 55]

$$\mathbb{E}_{[v(t)]} \leq \mathbb{E}_{[\max_t \{\hat{x}(t), x(t)\}]} = \gamma$$

[Math. 56]

$$\mathbb{E}_{[x(t)-\hat{x}(t))^+]} = \alpha^-$$

Proof: From definition 2, the capacity range is defined as
[Math. 57]

Here, ε* indicates the smallest allowable value of prediction errors in which an average value of an input to W(t)/Q(t) becomes equal to an average value of an output of W(t)/Q(t).

From the above, a Lyapunov drift can be rewritten as shown in the following equation.
[Math. 26]

$$\Delta L(Q(t), W(t)) \leq \mathbb{E}[B'_W + B'_Q] + \mathbb{E}[W(t)(\varepsilon^+ - \varepsilon^*)| W(t)] + \mathbb{E}[Q(t)(\varepsilon^- - \varepsilon^+)|Q(t)]. \quad (26)$$

It can be seen that Equation (23) is established when t is added from 0 to T and T→∞.

Due to strong stability of the double queuing system, an average value of an output of the queue is not smaller than an average value of the input of the queue. For example, when Q(t) is strongly stable, a penalty is imposed to selection of a larger value of v(t) from
[Math. 58]

$$\varepsilon^* + \beta + \mathbb{E}[u(t)] \geq \mathbb{E}[(x(t)-\hat{x}(t))^+] + \mathbb{E}[(x(t)-\hat{x}(t)+v(t))^+ 1_{[\hat{x}(t) > s(t)]}].$$

The same applies to W(t).

Selection of ε⁺ and ε⁻ has a great influence on prediction performance. That is, large values of ε⁺ and ε⁻ increase the prediction error, and when ε⁺ and ε⁻ are set to small values, the system becomes unstable. One-dimensional search is performed to determine an optimal ε⁺ and ε⁻ according to the stable region of the double queuing system.

Simulation Results

A simulation was performed to show the effectiveness of a proposed method. As traffic data for evaluation, link data of the European backbone network G'EANT was used. Measurements were performed every 15 minutes for four months using sample data in units of Kbps. Here, 10772 pieces of traffic data from 2015 Jan. 1 00:00 AM to 2015 Apr. 30 00:00 AM were used. As an evaluation index, a normalized root mean square error (normalized RMSE) expressed by the following equation was used.
[Math. 27]

[Math. 27]

$$RMSE = \sqrt{\frac{1}{Z}\sum_{t=1}^{Z}\frac{1}{N}\sum_{i=0}^{N-1}\left(\frac{x(Nt+i)-\bar{x}(Nt+i)}{x(Nt+i)}\right)^2}, \quad (27)$$

Here, Z is the number of measurement days used for prediction.

Figure 4:
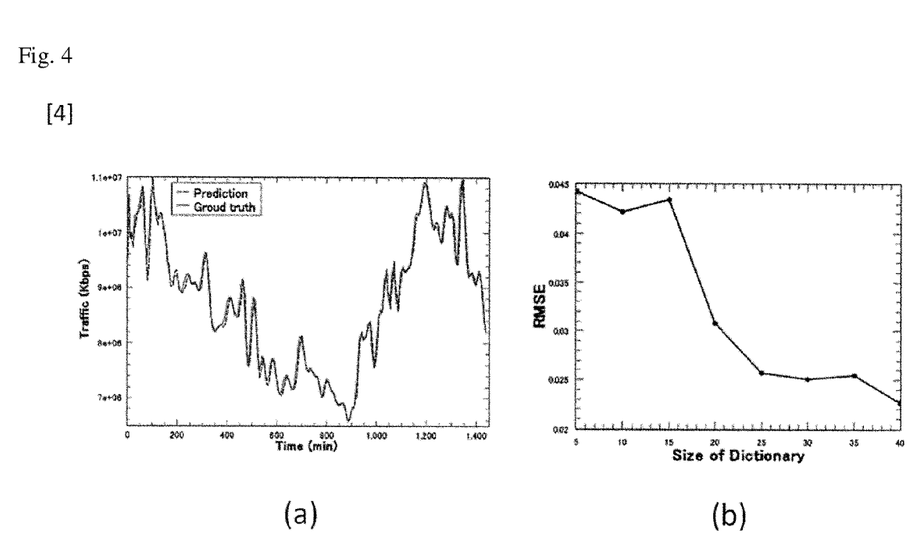
FIG. 4 illustrates an example of a double queuing system.

FIG. 4 illustrates characteristics of the proposed method. FIG. 4(a) illustrates a comparison with a true value. A size of the dictionary was T=25. The proposed method can accurately predict tendency or features of fluctuation in the true value. FIG. 4(b) illustrates an RMSE during changing sizes of the dictionary. It can be seen that the larger the size of the dictionary, the smaller the error. It is conceivable that this results from the fact that a plurality of traffic patterns can be represented by fully equipped bases, sparsity is improved, and a range of the representation is expanded.

For a performance comparison, a comparison with the following four schemes of the related art was performed.

1) Support Vector Regression (SVR): The number of feature quantities was 100, a kernel was a radial basis function (RBF), and a stop condition was 0.001.

2) ARIMA(p, d, q): An order of an auto-regressive coefficient is p=5, an order of a moving average coefficient is q=0, and an order of an integration process is d=1.

3) Long Short-Term Memory (LSTM): All neurons of a memory block were connected, and a size of a memory cell was set to 300.

4) RCLSTM: The neurons of the memory block were randomly and sparsely connected (only 1% of neurons), and a size of a memory cell was set to 30.

Figure 5:
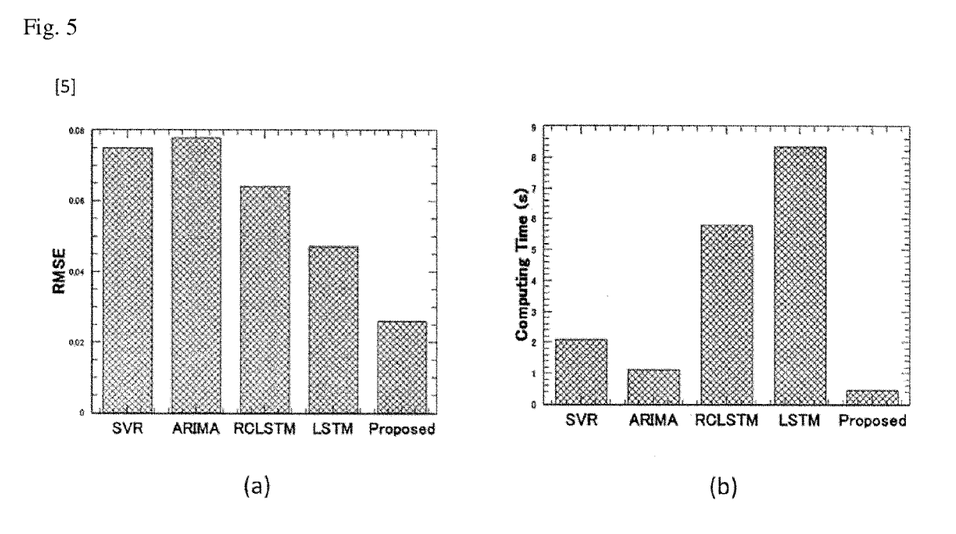
FIG. 5 illustrates an example of performance evaluation of the present disclosure.

FIG. 5 illustrates results of performance comparison with a method of the related art. It can be seen that the proposed method achieves the best performance in terms of both the prediction accuracy and the amount of calculation. SVR or ARIMA based on the theory of stochastic processes has a relatively small amount of calculation, but has a large prediction error. This is considered to be a result of being unable to follow sudden traffic fluctuations. For LSTM and RCLSTM based on deep learning, estimation accuracy is not significantly improved as compared with SVR or ARIMA even though the learning set is set to be very large (96 days out of 120 days). To improve the estimation accuracy to some extent, it is necessary to increase a size of the learning set, but it is limited in a very dynamic environment. A large amount of calculation and frequent re-learning of parameters results from further increasing a calculation load. In the proposed method, it is considerable that this results from the fact that it is possible to adaptively keep a balance between long-term dependence and short-term dependence with a small amount of calculation based on the sparse representation, and it is possible to well follow sudden traffic fluctuation through the Lyapunov optimization.

CONCLUSION

The present disclosure proposes a traffic prediction scheme capable of following a sudden fluctuation with a small amount of calculation by constructing a prediction model based on the sparse representation and using the Lyapunov optimization together. It was confirmed that simulation enables highly accurate prediction with a smaller amount of calculation as compared with support vector regression (SVR) of a method in the related art, ARIMA(p, d, q) based on the theory of stochastic processes, and LSTM and RCL-STM based on deep learning.

EFFECTS OF THE PRESENT DISCLOSURE

The prediction model based on the sparse representation combined with the Lyapunov optimization according to the present disclosure makes it possible to perform prediction with a small amount of calculation and high accuracy even for unsteady traffic fluctuation.

INDUSTRIAL APPLICABILITY

The present disclosure can be applied to an information and communication industry.

REFERENCE SIGNS LIST

11: Input unit
12: Data division unit

13: Learning unit
14: Prediction unit
15: Prediction correction unit
16: Output unit
91: Traffic fluctuation prediction apparatus
92: Traffic measurement apparatus

The invention claimed is:

1. A traffic fluctuation prediction apparatus, comprising:
a processor; and
a storage medium having computer program instructions stored thereon, when executed by the processor, perform to:
divide time-series data of traffic into two data sets;
learn a dictionary $D_r(t)$ using one of the two divided data sets, and learn a dictionary $D_p(t)$ using the other of the two divided data sets;
obtain a sparse code $Y_N(t)$ in representing the time-series data using the dictionary $D_r(t)$, and obtain a predicted value $X_N\hat{}(t)$ of future traffic using the obtained sparse code $Y_N(t)$ and the dictionary $D_p(t)$; and
using a search for a stable region of a double queue of overestimation and underestimation, a prediction error of the predicted value $X_N\hat{}(t)$.

2. A traffic fluctuation prediction method, comprising:
dividing, by a data division unit, time-series data of traffic into two data sets;
learning, by a learning unit, a dictionary $D_r(t)$ using one of the two divided data sets, and learning, by the learning unit, a dictionary $D_p(t)$ using the other of the two divided data sets;
obtaining, by a prediction unit, a sparse code $Y_N(t)$ in representing the time-series data using the dictionary $D_r(t)$ learned in the learning unit, and obtaining, by the prediction unit, a predicted value $X_N\hat{}(t)$ of future traffic using the obtained sparse code $Y_N(t)$ and the dictionary $D_p(t)$ learned in the learning unit; and
correcting, by a prediction correction unit, a prediction error of the predicted value $X_N\hat{}(t)$ using a search for a stable region of a double queue of overestimation and underestimation.

3. A non-transitory computer-readable medium having computer-executable instructions that, upon execution of the instructions by a processor of a computer, cause the computer to execute:
dividing, by a data division unit, time-series data of traffic into two data sets;
learning, by a learning unit, a dictionary $D_r(t)$ using one of the two divided data sets, and learning, by the learning unit, a dictionary $D_p(t)$ using the other of the two divided data sets;
obtaining, by a prediction unit, a sparse code $Y_N(t)$ in representing the time-series data using the dictionary $D_r(t)$ learned in the learning unit, and obtaining, by the prediction unit, a predicted value $X_N\hat{}(t)$ of future traffic using the obtained sparse code $Y_N(t)$ and the dictionary $D_p(t)$ learned in the learning unit; and
correcting, by a prediction correction unit, a prediction error of the predicted value $X_N\hat{}(t)$ through search for a stable region of a double queue of overestimation and underestimation.

* * * * *